United States Patent Office 3,332,846

Patented July 25, 1967

1

3,332,846
METHOD OF INDUCING HYPOGLYCEMIA WITH A SUBSTITUTED INDOLE

Samuel Gordon, Pearl River, N.Y., assignor to American Cyanamid Company, Stamford, Conn., a corporation of Maine No Drawing. Filed Mar. 2, 1965, Ser. No. 436,636
7 Claims. (Cl. 167—65)

This invention relates to new compositions of matter. More particularly, it relates to novel compositions and methods of administration.

We have now found that compositions containing one or more of the following compounds are orally effective in lowering blood sugar.

Compounds of the formula:

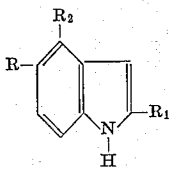

wherein R is selected from the group consisting of hydrogen, lower alkyl and lower alkoxy, $R_2$ is hydrogen or halogen and $R_1$ is selected from the group consisting of carboxy, hydroxymethyl and carb(lower)alkoxy. The lower alkyl and lower alkoxy groups of this invention are those having from 1 to 4 carbon atoms, for example, methyl, ethyl, propyl, butyl, isopropyl or isobutyl. The halogen atoms are, for example, chlorine, bromine, iodine or fluorine.

The substituted indoles of the present invention are prepared by methods described in the prior art and many of the compounds are commercially available.

This invention is the induction of hypoglycemia through the use of orally administered compositions of matter. The compounds of this invention, the active ingredients of the novel compositions of matter, have been found to be effective in lowering blood sugar over a prolonged period of time when administered orally. The high potency of these compounds, as indicated by the relatively small amounts of compounds needed to produce the desired hypoglycemic effect, together with their apparent ease of absorbence from the gastro-intestinal tract indicate them to be potentially useful for the treatment of diabetes. Of particular interest is the fact that they have been found to be effective both in normal and alloxan-induced diabetic warm-blooded animals. The therapeutic effect of these compounds, thus, is similar to insulin and unlike many other oral hypoglycemics which are only effective in lowering blood sugar in normal animals.

While the method of administering the active ingredients of the novel compositions of matter of the present invention is not limited to oral administration, a decided advantage of the present invention is that the active ingredients may be administered orally in any convenient manner. They may be taken orally, for example, with an inert diluent or with an assimilable edible carrier, or they may be compressed into tablets, or enclosed in hard or soft gelatin capsules. Furthermore, the active ingredients may be administered either individually or as mixtures of a plurality of such active ingredients. The amount of a single dose or of a daily dose necessary to induce a particular level of hypoglycemia will vary with the size or weight of the warm-blooded animal to be treated.

Generally, it should be such as to give a proportionate dosage of from about 2.5 mg. to about 25 mg. per kg. of body weight per day of, for example, 5-methoxyindole-2-carboxylic acid, a highly active compound, or other active ingredient or mixture thereof. In terms of total weight of active ingredient, the daily dosage for warm-blooded animals of, for example, 75 kilograms would amount to from about 0.1 g. to about 2.0 g. The dosage regimen may be adjusted to provide optimum therapeutic response: for example, several divided doses may be administered daily or the dose may be proportionately reduced or increased as the requirements of the therapeutic situation would indicate.

2

It is not known how the compounds of this invention operate to induce hypoglycemia in mammals and no theory of how or why these compounds so operate is advanced. It is not intended that the present invention should be limited to any theory as to mechanism.

The following examples illustrate the hypoglycemic effect of the novel compositions of the present invention and the method of administering them.

EXAMPLE 1

*Hypoglycemic activity of 5-methoxyindole-2-carboxylic acid in fasted rats*

Normal, male Sherman strain rats weighing approximately 140 g. were fasted overnight and used on the following morning. One hundred mg. of 5-methoxyindole-2-carboxylic acid was suspended in 4 ml. of a 0.5% carboxymethyl cellulose solution. Appropriate volumes of the active ingredient-carboxymethyl cellulose suspension for varying dosages were administered orally to the rats by gavage (stomach tube). Blood was removed from the tail of the respective animals after three hours and analyzed for glucose on the Technicon AutoAnalyzer ®. Appropriate standards and controls were also analyzed for comparison purposes. The response to various levels of the compound is shown in Table I below.

TABLE I.—HYPOGLYCEMIC ACTIVITY OF 5-METHOXY-INDOLE-2-CARBOXYLIC ACID AFTER THREE HOURS IN FASTED RATS

| Dose,[1] mg./kg. | Blood Glucose, Average mg./100 ml. of Blood | Percent of Control |
|---|---|---|
| 150 | 36 | 41 |
| 100 | 63 | 71 |
| 75 | 79 | 89 |
| Control | 89 | 0 |

[1] Six rats per group.

EXAMPLE 2

*Hypoglycemic activity of 5-methoxyindole-2-carboxylic acid in mice*

Normal, female (ICR) mice weighing 20–25 g. were used. A procedure, as described in Example 1, was generally followed making certain necessary changes. The response to various levels of 5-methoxyindole-2-carboxylic acid is shown in Table II below.

TABLE II.—HYPOGLYCEMIC ACTIVITY OF 5-METHOXY-INDOLE-2-CARBOXYLIC ACID AFTER ONE HOUR IN MICE

| Dose,[1] mg./kg. | Blood Glucose, Average mg./100 ml. of Blood | Percent of Control |
|---|---|---|
| 50 | [2] 38±6.8 | 49 |
| 25 | 48±8.5 | 58 |
| 12.5 | 75±7.7 | 94 |
| Control | 78±3.1 | ---------- |

[1] Six mice per group.
[2] Means ± standard error of the mean.

EXAMPLE 3

*Hypoglycemic activity of 5-methoxyindole-2-carboxylic acid on alloxan-induced diabetic mice*

Normal (MFI), male mice weighing approximately 25 g. were injected with 80 mg./kg. i.v. of Alloxan to induce diabetes. A procedure, as described in Example 1, was generally followed making certain necessary changes. The response to various levels of 5-methoxyindole-2-carboxylic acid is shown in Table III below.

TABLE III.—HYPOGLYCEMIC ACTIVITY OF 5-METHOXY INDOLE-2-CARBOXYLIC ACID AFTER TWO AND FOUR HOURS IN ALLOXAN-INDUCED DIABETIC MICE

| Dose,[1] mg./kg. | Blood Glucose, Average mg./100 ml. Blood | | |
|---|---|---|---|
| | 0 Hours | 2 Hours | 4 Hours |
| 250 | 450 | 276 | 211 |
| 125 | 452 | 292 | 329 |
| 62.5 | 520 | 332 | 406 |

[1] Five mice per group.

EXAMPLE 4

*Hypoglycemic activity of related indolecarboxylic acid compounds in rats*

Procedure used as in Example 1. Response to indole-2-carboxylic acid and 5-methylindole-2-carboxylic acid is shown in Table IV below.

TABLE IV.—HYPOGLYCEMIC ACTIVITY OF INDOLE-S CARBOXYLIC ACID AND 5-METHYLINDOLE-2-CARBOXY LIC ACID IN RATS

| Compound | Dose, mg./kg. | Blood Glucose, percent lowering |
|---|---|---|
| Indole-2-carboxylic acid | 250 | 40 |
| | 100 | 33 |
| 5-Methylindole-2-carboxylic acid | 200 | 58 |

I claim:

1. The method of inducing hypoglycemia in warm-blooded animals which comprises administering orally to a warm-blooded animal in which a hypoglycemic effect is desired from about 2.5 milligrams to about 25 milligrams per kilogram of body weight per day of a substituted indole of the formula:

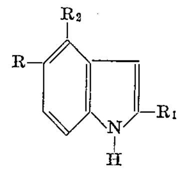

wherein R is selected from the group consisting of hydrogen, lower alkyl and lower alkoxy, $R_1$ is selected from the group consisting of carboxy, hydroxymethyl and carb (lower)alkoxy and $R_2$ is selected from the group consisting of hydrogen and halogen.

2. The method of inducing hypoglycemia in warm-blooded animals according to claim 1, wherein the substituted indole is 5-methoxyindole-2-carboxylic acid.

3. The method of inducing hypoglycemia in warm-blooded animals according to claim 1 wherein the substituted indole is indole-2-carboxylic acid.

4. The method of inducing hypoglycemia in warm-blooded animals according to claim 1 wherein the substituted indole is 5-methylindole-2-carboxylic acid.

5. The method of inducing hypoglycemia in warm-blooded animals according to claim 1 wherein the substituted indole is 2-indole methanol.

6. The method of inducing hypoglycemia in warm-blooded animals according to claim 1 wherein the substituted indole is 4-chloro-2-indolecarboxylic acid.

7. The method of inducing hypoglycemia in warm-blooded animals according to claim 1 wherein the substituted indole is 2-indolecarboxylic acid, 5-methyl, ethyl ester.

References Cited

Chemical Abstracts, Sixth Collective Index, volumes 51 to 55, 1957–61, subject H–MH, pages 6080s and 6082s.

ALBERT T. MEYERS, *Primary Examiner.*

JULIAN S. LEVITT, *Examiner.*

J. D. GOLDBERG, *Assistant Examiner.*